United States Patent
Okajima et al.

(10) Patent No.: US 6,841,254 B2
(45) Date of Patent: Jan. 11, 2005

(54) COATED FILM

(75) Inventors: Nariaki Okajima, Minato-ku (JP); Yoshio Shimizu, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 142 days.

(21) Appl. No.: 10/146,768

(22) Filed: May 16, 2002

(65) Prior Publication Data

US 2003/0054175 A1 Mar. 20, 2003

(30) Foreign Application Priority Data

May 21, 2001  (JP) ........................................ 2001-150445

(51) Int. Cl.$^7$ .............................................. C08G 18/48
(52) U.S. Cl. ..................................... 428/423.7; 524/839
(58) Field of Search ......................... 428/423.7; 524/839

(56) References Cited

U.S. PATENT DOCUMENTS

| | | | |
|---|---|---|---|
| 3,920,598 A | 11/1975 | Reiff et al. ................. 260/29.2 |
| 4,098,933 A | 7/1978 | Burkhardt et al. .......... 427/379 |
| 4,364,885 A | 12/1982 | Kanai et al. ................. 264/134 |
| 5,281,472 A | 1/1994 | Takahashi et al. .......... 428/336 |
| 5,476,707 A | 12/1995 | Fiard et al. ................. 428/141 |
| 6,146,819 A | * 11/2000 | Furukawa et al. .......... 430/535 |
| 6,165,602 A | * 12/2000 | Fujita .......................... 428/216 |

FOREIGN PATENT DOCUMENTS

| | | |
|---|---|---|
| EP | 0 135 982 A1 | 4/1985 |
| EP | 0 703 255 A1 | 3/1996 |
| EP | 0 707 979 A2 | 4/1996 |
| EP | 0 779 326 A1 | 6/1997 |
| EP | 0 884 348 A2 | 12/1998 |
| EP | 0 959 087 A1 | 11/1999 |

\* cited by examiner

*Primary Examiner*—Rachel Gorr
(74) *Attorney, Agent, or Firm*—David G. Conlin; Christine C. O'Day; Edwards & Angell, LLP

(57) ABSTRACT

The present invention relates to a coated film comprising a polyester film having a coat on at least one side thereof, obtained by applying on at least one side of a polyester film a coating solution containing (1) a self-emulsifiable isocyanate having repeating units of ethylene oxide and two or more isocyanate groups, and (2) at least one polymer selected from the group consisting of polyesters, polymers of vinyl monomers and polyurethanes, then drying and stretching the coated film.

25 Claims, No Drawings

COATED FILM

BACKGROUND OF THE INVENTION

The present invention relates to a coated film, more particularly, it relates to a stretched polyester film having a novel coating layer with excellent transparency, gross, anti-block properties and adhesion to overcoating.

Since stretched polyester films have excellent properties such as mechanical strength, dimensional stability, flatness, smoothness, heat resistance, chemical resistance and transparency, they have been widely used as a base film of magnetic recording medium, a film for printing, magnetic card, synthetic paper, etc.

While the polyester films have such excellent properties, they are poor in adhesion, which is a problem common to the plastic films in general. For instance, the polyester films have poor adhesion to printing inks (printing ink for cellophane, chlorinated PP ink, ultraviolet curing ink, magnetic ink, etc.), thermal transfer ink, magnetic coatings, adhesives (laminating adhesives, wood adhesives, etc.), overcoating materials (releaser, ink image receiving layer, gelatin, polyvinyl alcohol, polyvinyl acetal, cellulose acetate, cellulose butyroacetate, methyl cellulose, carboxymethyl cellulose, etc.), and deposited metals and inorganic materials (aluminum, silver, gold, ITO, silicon oxide, aluminum oxide, etc.). In recent years, attention has been focused especially on aqueous overcoatings (including ink) for lessening environmental contamination.

As a method of solving the above problem, it is known to provide a coating layer on the polyester film surface. Especially the method in which coating is conducted in the course of the film forming process is preferable in view of economic and characteristics thereof. This technique is called "in-line coating." In a typical instance of this method, coating is conducted after longitudinal stretching and before transverse stretching, and then transverse stretching and heat setting are conducted. Such coating treatment improves adhesiveness of the film, but on the other hand, there arises a problem of tendency of the films to stick to each other (so-called blocking). In many cases, therefore, a crosslinking agent is further added to prevent blocking while improving adhesive quality of the films.

Recently, in order to reduce load on the environment, it has become an essential requirement that polyester films have good adhesiveness to water-based coating materials such as polyvinyl alcohol, polyvinyl acetal, polyvinyl pyrrolidone, methyl cellulose, carboxymethyl cellulose and gelatin. For instance, in case where a photosensitive layer utilizing a silver salt and gelatin is provided, this layer is exposed to many chemicals in the developing and fixing steps, so that such a layer is required to have enough durability to stand long-time preservation as well as strong adhesion to the base polyester film. Conventionally, for this purpose, polyvinylidene chloride, polyvinyl chloride and their copolymers have been used as undercoating. For providing even stronger adhesion, an additional undercoat containing gelatin is provided on the said layer. However, the coated films containing chlorine have a possibility of generating harmful dioxin compounds when burned. Also, the films having a silver salt coating may be withdrawn from the household or corporations to recover and reuse silver contained therein. But in this case, too, chlorine-based polymers remain in the polyester films left after recovery of silver, so that even if silver in the polymer films is recovered for reuse without burning the films, hydrogen chloride is generated when films are melted by heating. So, the development of chlorine-free undercoated polyester films has been desired.

Incorporation of a crosslinking agent in the coating composition is considered an effective way for reducing stickiness or blocking tendency, but generally addition of a crosslinking agent induces hardening of the coat. So, there arises a problem of a stretching conformability of the coating layer especially when the film is stretched after coating such as mentioned above. More specifically, if the coating layer is poor in stretchability, it fails to be stretched uniformly and may be fractured finely in the polyester film stretching step, thus forming microcracks in the coating layer in many cases. Such cracks in the coating layer cause such defects as reduction of adhesion to the overcoats, etc., and clouding of the coating layer due to scattering of light by fine unevenness of the coating layer surface. Thus, the problem arises that even when the base polyester film is not transparent, glossiness of the film surface lowers. Even if a crosslinking agent is added, there are occasions where the film-to-film sticking tendency (blocking) is not lessened as desired or, quite strangely, blocking is rather promoted. Therefore, when polyester films are coated and stretched, it is required to incorporate a crosslinking agent which meets especially the above-mentioned contradictory requirements, or a combination of such a crosslinking agent and a binder.

SUMMARY OF THE INVENTION

An object of the present invention is to provide a coated polyester film highlighting excellent transparency and gloss of the coat, strong adhesiveness and improved anti-block properties.

As a result of the present inventors' earnest study to attain the above object, it has been found that the above problem can be solved by using a combination of the specific compounds which show eminent stretch conformability as well as desired crosslinking characteristics and anti-block properties.

Thus, in the first aspect of the present invention, there is provided a coated film comprising a polyester film having a coat on at least one side thereof, obtained by applying on at least one side of a polyester film a coating solution containing (1) a self-emulsifiable isocyanate having repeating units of ethylene oxide and two or more isocyanate groups, and (2) at least one polymer selected from the group consisting of polyesters, polymers of vinyl monomers and polyurethanes, then drying and stretching the coated film.

In the second aspect of the present invention, there is provided a film roll comprising a coated film as defined in the above first aspect, wherein the gage nonuniformity in the width direction of the film is not more than 5%.

In the third aspect of the present invention, there is provided a coated film comprising a polyester film having a coat on at least one side thereof, the surface roughness (Ra) of the coated film being not more than 0.10 μm, and the blocking force (F) of the coated film being not more than 300 g.

DETAILED DESCRIPTION OF THE INVENTION

The present invention will be described in detail below.

The polyester constituting the polyester film of the present invention is the one obtained by using an aromatic dicarboxylic acid or an ester thereof and a glycol as the main starting materials. Examples of the preferable polyester have not less than 70% of the repeating structural units of ethylene terephthalate units, ethylene-2,6-naphthalate units, 1,4-cyclohexane terephthalate units or ethylene isophthalate units, and are especially preferably polyethylene terephthalate and polyethylene-2,6-naphthalate. It may contain other components as far as the above condition is met.

As the aromatic dicarboxylic acid, it is possible to use, for example, terephthalic acid, 2,6-naphthalenedicarboxylic acid, isophthalic acid, phthalic acid, adipic acid, sebasic acid, oxycarboxylic acids (such as p-oxyethoxybenzoic acid) and the like either singly or as a mixture of two or more of them. As the glycol, ethylene glycol, diethylene glycol, propylene glycol, butanediol, 1,4-cyclohexanedimethanol, neopentyl glycol, polyalkylene glycol and the like can be used either singly or as a mixture of two or more of them.

The intrinsic viscosity of these polyesters is usually not less than 0.45, preferably in the range of 0.50 to 1.0, more preferably 0.52 to 0.80. When the intrinsic viscosity is less than 0.45, there may arise the problems such as reduced productivity in manufacture of the film and reduced mechanical strength of the produced film. On the other hand, it is preferable that the intrinsic viscosity does not exceed 1.0 in view of melt extrusion stability of the polymer.

In the polyester film of the present invention, it is possible to contain the particles in the polyester so as to form appropriate projections on the film surface to provide proper slip characteristics to the film to thereby improving its handling qualities. Examples of such particles usable in the present invention include the inorganic particles such as the particles of calcium carbonate, calcium phosphate, silica, kaolin, talc, titanium dioxide, alumina, barium sulfate, calcium fluoride, lithium fluoride, zeolite, molybdenum sulfide, etc., the organic particles such as the particles of crosslinked polymers, calcium oxalate, etc., and the precipitated particles produced in polyester polymerization.

The size and amount of the particles to be contained in the film in the present invention, although variable depending on the purpose of use of the film, are generally as described below. The average particle size is preferably in the range of 0.005 to 5.0 $\mu$m, more preferably 0.01 to 3.0 $\mu$m. When the average particle size exceeds 5.0 $\mu$m, the film surface is roughened to an excess degree. Also, in a thin film, the insulating performance may deteriorate. Further, the particles become liable to fall off the film surface, causing so-called "drop-off of particles" in use of the film. When the average particle size is less than 0.005 $\mu$m, the effect of improving the slip characteristics of the film tends to lower because of insufficient formation of the protrusions by the particles. That is, the effect of improving the slip characteristics may not be provided unless the particles are contained in large quantities, but on the other hand, mechanical properties of the film may be impaired if the particles are added in large quantities.

The content of the particles is preferably not less than 30% by weight, more preferably 0.0001 to 30.0% by weight, still more preferably 0.010 to 20.0% by weight, based on the weight of polyester. When the particle content exceed the above-defined range, mechanical properties of the film may be deteriorated. The lower threshold content varies depending on the purpose of use of the film. The smaller the particle content, the better for a high-transparency film. A smaller particle content is also preferable for providing appropriate slip characteristics. In use for magnetic recording, slip characteristics of the film is an important quality factor, and usually a particle content of at least 0.1% by weight is necessary although it is variable depending on the size of the particles to be added. In the case of a white film produced by adding a white pigment such as calcium carbonate or titanium oxide, a particle content of not less than 2% by weight is usually needed. This is required in the case of producing a film with a high light-shielding effect; the lower threshold value of the particle content may be smaller in the case of a half-transparent film.

It is possible to contain in the film two or more types of these particles or the particles of the same type but differing in size. In either case, it is preferable that the average size of the particles contained in the film and their total content fall in the above-defined ranges.

In producing the particle-containing polyester, the particles may be added either in the course of the polyester synthesis or directly to the polyester. In case where the particles are added in the course of the polyester synthesis, it is preferable to use a method in which a slurry is formed by dispersing the particles in ethylene glycol or the like, and this slurry is added in a preferable phase of the polyester synthesis. On the other hand, in case where the particles are added directly to the polyester, a method is preferably used in which the dried particles or a slurry thereof formed by dispersing the particles in water or an organic solvent having a boiling point of not more than 200° C. is added and mixed with the polyester by using a double-screw extruder. If necessary, the particles to be added may have been subjected to such treatment(s) as pulverization, dispersion, classification and filtration before addition.

In order to adjust the particle content, a method in which first a master material containing the particles in a high concentration is prepared in the manner described above, and in the film forming process, this master preparation is diluted with a material which is substantially free of the particles to thereby adjust the particle content, is preferably used.

As the additives other than the said protrusion-forming agent, there can be contained as required such materials as antistatic agent, stabilizer, lubricant, crosslinking agent, anti-block agent, antioxidant, colorant (dye and pigment), light screen, ultraviolet absorber, etc. Thus, the polyester film according to the present invention may be, for instance, a colored film or a foamed thin sheet containing a plurality of fine air cells.

The polyester film of the present invention may be of a multi-layer structure as far as the finally satisfied properties of the film satisfy the requirements of the present invention. For instance, it may be a co-extruded laminated film. In this case, the above description relating to the base film applies to the polyester of the outermost surface layer. The films of the other (inner) layers may be made of any type of polyester, plastic material, paper or cloth. Such inner layer films may be, for instance, foamed films containing a plurality of fine air cells.

The polyester film of this invention may be either a monoaxially stretched film or a biaxially stretched film as far as it is a stretched polyester film. However, the biaxially stretched film is more widely used industrially.

Biaxial stretching of the polyester film is preferred by either simultaneous biaxial stretching or successive biaxial stretching, especially successive biaxial stretching is usually used. According to the successive biaxial stretching operation, the melt extruded polyester is cooled on a cooling drum to form a non-stretched film, and the non-stretched film is first stretched in the machine direction (longitudinal stretching) by a set of rolls differing in peripheral speed from each other, and then further stretched while held by a clip in the direction orthogonal to the longitudinal stretching direction. As a modification of this operation, both longitudinal stretching and transverse stretching may be conducted in several stages. Or they may be conducted alternatively until the film is stretched to the desired degree. This technique is used where a high-strength film is produced by a re-stretching method.

Next, the self-emulsifiable isocyanates having repeating units of ethylene oxide and two or more isocyanate groups, which can be used as coatings in the present invention, are explained. Preferred examples of the said type of self-emulsifiable isocyanates for use in the present invention are polyisocyanates having in the molecule an isocyanurate structure of a cyclic trimer skeleton formed by an aliphatic or alicyclic diisocyanate, and polyisocyanate compounds that can be obtained by using as base a polyisocyanate having a buret, urethane or like structure in the molecule and adding thereto a polyethylene glycol etherified at one terminal in only part of the polyisocyanate groups. The number of the said repeating ethylene oxide units is preferably 5 to 50. If it is less than 5 or ethylene oxide units are not present, the said compounds may prove poor in self-emulsifiability and may be unable to form a stable dispersion in water. On the other hand, if the said unit number is more than 50, the said compounds tend to be crystallized to form a solid. The content of the isocyanate groups in the said self-emulsifiable isocyanates is not specifically defined in the present invention, but it is preferably in the range of 8 to 25% by weight for the above-said reasons.

The self-emulsifiable isocyanate used in the present invention is preferably used in combination with an ionic surfactant so that this is conducive to the further improvement of self-emulsifiability of the isocyanate. An ionic surfactant is preferably added in an amount of 0.5 to 25% by weight of the said isocyanate. When its amount added is less than 0.5% by weight, its contribution to the dispersion of isocyanate may become insignificantly low. When the amount of the ionic surfactant exceeds 25% by weight, the content of surfactant in the finally prepared water-based coating may prove too high, resulting in an unsatisfactory strength of the coat.

In the present invention, the following ionic surfactants can be exemplified. As the anionic surfactants, carboxylate type, sulfate type, sulfonate type and phosphate type are preferred, the examples thereof including ammonium ($C_1$–$C_{20}$ alkyl)benzenesulfonate, sodium ($C_1$–$C_{20}$ alkyl) disulfate, sodium alkyldiphenyletherdisulfonate, di($C_1$–$C_{20}$ alkyl), sodium sulfosuccinate, sodium polyoxyethylene $C_6$–$C_{30}$ arylethersulfonate, and ammonium polyoxyethylene $C_6$–$C_{30}$ arylethersulfonate. As the cationic surfactants, quaternary ammonium salts, pyridinium salts and imidazolinium salts are preferred, their examples including $C_1$–$C_{20}$ alkyltrimethylammonium bromide, $C_1$–$C_{29}$ alkylpyridinium bromide and imidazolinium laurate.

Since a highly reactive isocyanate compound is used with water, an organic solvent may be used as desired.

The coating composition according to the present invention comprises a self-emulsifiable isocyanate such as mentioned above and at least one polymer selected from the group consisting of polyesters, polymers of vinyl monomers and polyurethanes. It is to be understood that these "polymers" include their derivatives. The derivatives mentioned here refer to the copolymers with other polymers and the polymers produced by reacting the reactive compounds with functional groups. Polyvinylidene chloride, chlorinated polyolefins and such are also capable of forming a tough coat with strong adhesion to the topcoat, but as they contain chlorine, they have a possibility of generating the chlorine-containing harmful dioxin compounds when burned. They also involve the problems of coloration and generation of corrosive gases in recycling of the coated film scraps.

The said polyesters, polymers of vinyl monomers and polyurethanes are explained in detail below.

As the components of the polyester used as a binder for the coating layer in the present invention, there can be exemplified the polyvalent carboxylic acids and polyvalent hydroxyl compounds such as listed below. Examples of the polyvalent carboxylic acids include terephthalic acid, isophthalic acid, orthophthalic acid, phthalic acid, 4,4'-diphenylcarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebasic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salt, and ester-forming derivatives thereof. Examples of the polyvalent hydroxyl compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate. The polyesters can be synthesized by the ordinary polycondensation reaction.

Besides the above-mentioned, the composite polymers having such polyester components as so-called acrylic graft polyesters such as disclosed in Japanese Patent Application Laid-Open (KOKAI) No. 1-165633 and polyester polyurethanes produced by chain-lengthening polyester polyols with an isocyanate are also included in the polyesters usable for coating composition binder in the present invention.

The polyester for coating composition binder used in the present invention is preferably the one which is capable of forming a coating composition using water as medium. The polyester may be of the type which is capable of forming a coating composition after forced dispersion by a surfactant or the like, but it is preferably a self-dispersing type polyester having hydrophilic nonionic components such as polyethers or cationic groups such as quaternary ammonium salts, more preferably a water-soluble or water-dispersible polyester resin having anionic groups. The "polyester having anionic groups" is a polyester to which a compound having anionic groups has been attached by means of copolymerization or grafting. The compound is properly selected from sulfonic acid, carboxylic acid, phosphoric acid and their lithium salt, sodium salt, potassium salt and ammonium salt.

The amount of the anionic groups in the polyester is preferably in the range of 0.05 to 8% by weight. When the amount of the anionic groups is less than 0.05% by weight, the produced polyester resin tends to deteriorate in water solubility or water dispersibility, while when the amount of the anionic groups exceeds 8% by weight, water resistance of the coating layer may deteriorate, or the obtained films may become liable to stick to each other (blocking) after moisture absorption.

The polymer of vinyl monomer used for the coating layer in the present invention are the polymers comprising the polymerizable monomers having carbon-carbon double bonds, specifically acrylic or methacrylic monomers. These polymers may be either homopolymers or copolymers. Copolymers of these and other polymers (such as polyesters and polyurethanes), which may be block or graft copolymers, are also included in the concept of said polymers in the present invention. They also include the polymers (polymer mixtures in some cases) obtained by polymerizing the polymerizable monomers having carbon-carbon double bonds in a polyester solution or a polyester dispersion; the polymers (polymer mixtures in some cases) obtained by polymerizing the polymerizable monomers having carbon-carbon double bonds in a polyurethane solution or a polyurethane dispersion; and the polymers (polymer mixtures in some cases) obtained by polymerizing the polymerizable monomers having carbon-carbon double bonds in other polymer solution or dispersion.

The polymerizable monomers having carbon-carbon double bonds usable in the present invention are not specified, but they include as typical examples thereof the following: monomers having various types of carboxyl groups, such as acrylic acid, methacrylic acid, crotonic acid, itaconic acid, fumaric acid, maleic acid, citraconic acid and their salts; monomers having various types of hydroxyl groups, such as 2-hydroxyethyl (meth)acrylate, 2-hydroxypropyl (meth)acrylate, 4-hydroxybutyl (meth)acrylate, monobutylhydroxyl fumalate and monobutylhydroxyl itaconate; various (meth)acrylic esters such as methyl (meth)acrylate, ethyl (meth)acrylate, propyl (meth)acrylate, butyl (meth)acrylate and lauryl (meth)acrylate; various types of nitrogen-containing vinyl monomers such as (meth)acrylamides, diacetone acrylamides, N-methylol acrylamides and (meth)acrylonitrile; styrene and various styrene derivatives such as a-methylstyrene, divinylbenzene and vinyltoluene, and various vinyl esters such as vinyl acetate and vinyl propionate; various silicon-containing polymerizable monomers such as g-methacryloxypropyltrimethoxysilane, vinyltrimethoxysilane and Silaplane FM-07 (a methacryloyl silicon macro-monomer produced by Chisso Corp.); phosphorus-containing vinyl monomers; various types of halogenated vinyls such as vinyl chloride, vinylidene chloride, vinyl fluoride, trifluorochloroethylene, tetrafluoroethylene, chlorotrifluoroethylene and hexafluoropropylene; and various types of conjugated dienes such as butadiene.

The method of producing the polymers from the above-mentioned vinyl monomers is not specified in the present invention; the ordinary methods can be used for their production. For example, the polymers can be obtained by mixing the monomers such as mentioned above and a polymerization initiator with an organic solvent, and heating the mixture with stirring, or by adding dropwise the monomers and a polymerization initiator to an organic solvent while heating with stirring. Also, an organic solvent, the monomers and a polymerization initiator may be polymerized in an autoclave under high pressure. It is further possible to use emulsion polymerization or suspension polymerization using water instead of an organic solvent and if necessary additionally using a surfactant.

The polymerization initiator required for reacting these monomers is not specifically designated, but the following may be cited as the representative compounds usable as the polymerization initiator in the present invention: inorganic peroxides such as ammonium persulfate and hydrogn peroxide; tertiary butyl hydroperoxides; various alkyl hydroperoxides such as p-menthane hydroperoxides; various dialkyl peroxides such as di-tert-butyl peroxides; organic peroxides; and various azo compounds such as azobisisobutyronitrile and azodi-tert-butane.

The said organic or inorganic peroxides may be combined with a reducing agent for use as redox catalysts. In this case, each component may comprise one or more compounds. The representative compounds usable as the reducing agent in the present invention are organic amines, L-ascorbic acid, L-sorbic acid, cobalt naphthenate, cobalt octhenate, iron naphthenate and iron octhenate.

As the polyurethane used for the coating layer in the present invention, it is possible to use the known polyurethanes such as disclosed in Japanese Patent Publication (KOKOKU) Nos. 42-24194, 46-7720, 46-10193 and 49-37839, and Japanese Patent Application Laid-Open (KOKAI) Nos. 50-123197, 53-126058 and 54-138098, and their derivatives. These polyurethanes can be produced by reacting polyisocyanates, polyols and if necessary a chain-lengthening agent and/or a crosslinking agent.

Examples of the polyisocyanates usable for the reaction include tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate.

As polyols, it is possible to use polyetherpolyols such as polyoxyethylene glycol, polyoxypropylene glycol and polyoxytetramethylene glycol; polyesterpolyols such as polyethylene adipate, polyethylene-butylene adipate and polycaprolactone; acrylic polyols, and castor oil. Usually, polyols having a molecular weight of 300 to 2,000 are used.

As the chain-lengthening agent or crosslinking agent, there can be used, for instance, ethylene glycol, propylene glycol, butanediol, diethylene glycol, trimethylolpropane, hydrazine, ethylenediamine, diethylenetriamine, 4,4'-diaminodiphenylmethane, 4,4'-diaminodicyclohexylmethane, and water.

The said polyurethanes preferably have an anionic substituent, for example, —$SO_3H$ group, —$OSO_3H$ group, —COOH group and their ammonium salts, alkaline metal salts and alkaline earth metal salts, for bettering solubility in the solvents using water as main medium. The following methods (1) to (3) can be cited as means for preparing these polyurethanes, but the present invention is not limited to these embodiments.

(1) A method using the compounds having an anionic substituent as the polyisocyanate, polyol and chain-lengthening agent.

For instance, a polyisocyanate having an anionic substituent can be obtained by sulfonating an aromatic isocyanate compound. It is also possible to use an isocyanate compound having a sulfuric ester salt or diaminocarboxylic acid salt of an amino-alcohol.

(2) A method comprising reacting a compound having an anionic substituent with the unreacted isocyanate group of the produced polyurethane.

As the compound having an anionic substituent, there can be used the compounds having, for example, a bisulfite, aminosulfonic acid or its salts, aminocarboxylic acid or its salts, sulfuric ester of an amino-alcohol or its salts, or hydroxyacetic acid or its salts as the anionic substituent.

(3) A method comprising reacting an active hydrogen-containing group (OH, COOH, etc.) of the polyurethane with a specific compound.

As the specific compound, there can be used, for example, dicarboxylic acid anhydrides, tetracarboxylic acid anhydrides, sultone, lactone, epoxycarboxylic acid, epoxysulfonic acid, 2,4-dioxo-oxazolidine, isatonic acid anhydrides, and phostone. It is also possible to use the 3- to 7-membered ring cyclic compounds having a salt type group or a group capable of forming a salt after ring opening, such as carbyl sulfate.

Among the said polyesters, polymers of vinyl monomers and polyurethanes usable as the coating compound in the present invention, the preferred polymers are those having a glass transition temperature (Tg) of not lower than 0° C., preferably not lower than 40° C., especially polyurethanes, inter alias polyester polyurethanes having carboxylic acid residues, which have at least partly been aquated with an amine or ammonia, and satisfying the following conditions (1) and (2) at the same time:

$$\text{Tensile force} \geq 200 \text{ kg/cm}^2 \quad (1)$$

$$\text{Elongation} \leq 250\% \quad (2)$$

Both tensile force and elongation were measured at room temperature. The polyester polyurethanes referred to herein are the polyurethanes in which a polyester is used as polyol, and which can form a synthetically excellent coat when used in combination with a self-emulsifiable isocyanate of the present invention for in-line coating. Specifically, these polyester polyurethanes can form a transparent coat with strong adhesion to the topcoating and excellent anti-block properties. There are also known industrially polyether polyurethanes, polycarbonate polyurethanes, etc., but polyester polyurethanes are especially preferred sinthetically when used in combination with a self-emulsifiable isocyanate according to the present invention.

The coating solution used in the present invention preferably contains a water-soluble organic solvent having a higher boiling point than water. This is conducive to the improvement of transparency of the coat and adhesion to the topcoating. The preferred organic solvents for use in the present invention are those having a boiling point of 100 to 300° and a water solubility at 20° C. of not less than 1%. Examples of such organic solvents include n-butyl alcohol, diacetone alcohol, cellosolve acetate, methyl cellosolve, ethyl cellosolve, butyl cellosolve, methyl carbitol, ethyl carbitol, butyl carbitol, 3-methyl-methoxybutanol, ethylene glycol monoisopropyl ether, propylene glycol monomethyl ether, ethylene glycol monoisobutyl ether, texanol, dimethylformamide, and N-methyl-2-pyrrolidone.

Optional polymers can be used as the binder other than those mentioned above. Such polymers are preferably ones which are reactable with the self-emulsifiable isocyanate used in the present invention, for example, the polymers having hydroxyl groups, including but not limited to polyols, polyvinyl alcohol, hydrolyzates of epoxy resins, and (co)polymers of 2-hydroxyethyl methacrylate.

The polymer used as binder is preferably one having an epoxy group. Examples of such polymer include all types of epoxy resins, but water-soluble or water-dispersible epoxy resins are preferred.

The polymers having carboxyl groups are also preferred for use as binder. The polymers having carboxyl groups referred to herein include those in which the carboxyl groups are neutralized if not entirely but only partly. Examples of such polymers are carboxymethyl cellulose and its sodium salts, potassium salts, ammonium salts and amine salts. They also include (overlapping the afore-mentioned polymers of vinyl monomers) polyacrylic acid (co)polymers, poly(meth) acrylic acid (co)polymers and their sodium salts, potassium salts, ammonium salts and amino salts, and (overlapping the afore-mentioned polyurethanes) the aqueous polyurethanes in which a carboxyl group has been introduced and converted into a sodium salt, potassium salt, ammonium salt or amine salt such to make the polyurethanes water-soluble or water-dispersible.

The polymers having oxazoline groups are also preferred as binder. The polymers having oxazoline groups referred to herein are the polymers having at least one oxazoline ring. As the oxazoline compound, any of the 2-oxazoline, 3-oxazoline and 4-oxazoline compounds can be used, but the 2-oxazoline compounds are preferred as they are highly reactive and industrially used.

Amino resins can be also preferably used as binder. The "amino resins" referred to herein are the polymers or pre-polymers produced by reacting amino or amide compounds with aldehydes, or the derivatives thereof. Examples of the skeletal amino or amide compounds include the following but are not limited thereto: homopolymers of urea, thiourea, ethyleneurea, dihydroxyethyleneurea, triazones, melamine, isomelamine, benzoguanamine, glycoluril, acetoguanamine, guanylmelamine, dicyandiamide, homopolymer of dicyandiamide, copolymer of dicyandiamide, aminoacryl (acrylic monomer containing amino groups), homopolymer of aminoacryl, and copolymer of aminoacryl. Examples of the aniline aldehyde compounds include but are not limited to formaldehyde and acetaldehyde.

Examples of the polymers and prepolymers produced by the reaction of amino or amide compounds with aldehydes include the following (part of which are often called methylolated amino resins): monomethylolurea, dimethylolurea, trimethylolurea, tetramethylolurea, methyleneurea, methylolmethyleneurea, methylolmethyleneurea trimer, monomethylolmelamine, dimethylolmelamine, trimethylolmelamine, tetramethylolmelamine, pentamethylolmelamine, hexamethylolmelamine, monomethylolbenzoguanamine, dimethylolbenzoguanamine, trimethylolbenzoguanamine, tetramethylolbenzoguanamine, monomethylolglycoluril, dimethylolglycoluril, trimethylolglycoluril, tetramethylolglycoluril, homopolymer of N-methylolacrylamide and copolymer of N-methylolacrylamide. The derivatives of these compounds, such as alkyletherified amino resins, are also preferred.

Example of the industrially available amino resins include urea resins, melamine resins, benzoguanamine resins, glycoluril resins, co-condensates of these resins, and co-condensates (such as aminoalkyd resins) of these resins with other resins (such as alkyd resins). The melamine resins, for instance, are industrially produced as a co-condensate of melamine, formaldehyde and methanol (or butanol). Therefore, there can be obtained the melamine resins of various compositions by changing the ratios of melamine, formaldehyde and methanol (or butanol). Both methanol and butanol may be used as a mixture. Strictly speaking, the industrially available melamine resins may be deemed as mixtures or (co-)condensates of some of the above-mentioned compounds.

The self-curing reaction of the said amino resins or the reaction thereof with other functional groups is accelerated by heat and a catalyst. As catalyst, the organic acids or inorganic acids are effective, the examples thereof including but not limited to: phosphoric acid, hydrochloric acid, sulfuric acid, methanesulfonic acid, paratoluenesulfonic acid, dodecylbenzenesulfonic acid, dinonylnaphthalenesulfonic acid, dinonylnaphthanedisulfonic acid, and partial salts, partial esters, ammonium salts and amine salts of these acids.

The coated film according to the present invention shows strong adhesion to the topcoating but is low in blocking tendency. This is an important feature of the present invention. Conventionally, in forming a photosensitive layer by utilizing a silver salt and gelatin, polyvinylidene chloride, polyvinyl chloride or a copolymer thereof has been used as an undercoating, and for further increasing its adhesive quality, an additional undercoat containing gelatin has been provided thereon. Such conventional coated films had high blocking tendency, therefore a great deal of care was required for handling the rolled films. However, the blocking tendency is greatly lessened when a self-emulsifiable isocyanate and a binder according to the present invention are used.

In view of the above, it is preferable that a polymer having a glass transition temperature of preferably not lower than 0° C., more preferably not lower than 40° C., be contained. Use of a polyester polyurethane that satisfies the above-mentioned conditions (1) and (2) provides further improvement of adhesion to the topcoating. It is to be noted, however, that when it is tried to satisfy the above conditions by using a perfectly aqueous coating compound (solvent), although adhesion and anti-block properties are generally improved, the formed coat may become cloudy or be deprived of its gloss. In an extreme case, micro-cracks may develop in the coat to rather lower adhesion. In order to prevent such an undesirable phenomenon from occurring, it is preferable to incorporate a water-soluble organic solvent. Another preferable method for lowering blocking tendency of the produced coated film is to add the fine particles satisfying the following conditions (3) and (4) in the coating solution.

$$0.5\ h < d < 2\ h \tag{3}$$

$$d < 0.2\ \mu m \tag{4}$$

wherein d is the diameter ($\mu$m) of the fine particles, and h is the coat thickness ($\mu$m) after drying and stretching.

When $0.5\ h \geq d$, the effect of reducing the blocking tendency may be unsatisfactory, and when $d \geq 2\ h$, adhesion to the topcoating tends to lower. Adhesion to the topcoating may also lower when $d \geq 0.2\ \mu m$. It was found that by satisfying the above conditions, it is possible to fulfill the antagonistic requirements for high adhesion and for transparency, glossiness and anti-block properties of the coat.

By observing the above-said conditions in the film forming process, it is possible to produce a coated film which is flat with high planarity and also low in blocking tendency. It is particularly notable that there can be obtained a coated film whose surface roughness (Ra) is not more than 0.10 $\mu$m, preferably 0.05 $\mu$m (as measured according to JIS-B0601-1982 under the conditions of: feeler end radius=2 $\mu$m; load=30 mg; cut-off=0.08 mm) and which, when rolled up, presents a gage nonuniformity in the roll's width direction of not more than 5%, with the blocking force of the film being not more than 300 g. When the blocking force is 500 g or more, the film roll has a possibility of causing blocking of the film. The blocking force is preferably not more than 300 g. When it is not more than 100 g, there is little fear of causing blocking. "Gage nonuniformity" and "blocking force" referred to herein are as explained below. Conventionally, a coated film with a small surface roughness and a small gage nonuniformity had a blocking tendency over its whole surface, but the present invention has made it possible to reduce blocking force of even such a film.

<Gage Nonuniformity>

A specimen was cut out from a film roll in its width direction, and the thickness of this specimen was measured along its full length, drawing up a thickness profile. With the average thickness represented by T, maximum thickness by Tmax and minimum thickness by Tmin, gage nonuniformity was calculated from the following equation.

Gage nonuniformity (%)=100(Tmax−Tmin)/T

<Blocking Force>

The films were placed one over another and pressed under the conditions of 40° C., 80% RH and 10 kg/cm$^2$ for 20 hours. The pressed films are mostly stuck up to each other. The stuck-up films were peeled, measuring peel strength according to ASTM-D-1893. The greater the peel strength, the higher the blocking tendency. When such films are rolled up, blocking tends to take place in the roll, making the film roll non-conforming as an industrial product. Even the heavy-gage films may be broken when unrolled if they have a high blocking tendency.

The coating composition used in the present invention is preferably the one using water as medium for reasons of hygienic safety, but the composition may contain an organic solvent provided that it does not overstep the concept of the present invention, and that the compound containing such a solvent can be dissolved in water.

The solids concentration of the coating composition used in the present invention is not specifically defined, but it is preferably in the range of 0.4 to 65% by weight, more preferably 1 to 30% by weight, most preferably 2 to 20% by weight.

As means for applying the said coating solution on a polyester film, it is possible to use the various coating devices such as illustrated in Yuji Harasaki: Handbook of Coating Devices and Their Operational Techniques, Sogo Gijutsu Center, 1990, which include forward roll coater, reverse roll coater, gravure coater, knife coater, blade coater, rod coater, air doctor coater, curtain coater, fountain coater, kiss-coater, kiss-roll coater, bead coater, dip coater, screen coater, cast coater, spray coater, and other types of coaters and coating systems such as impregnator and LB coating system.

The pre-coated film may be subjected to a chemical treatment or discharge treatment for improving the coating properties and adhesion of the coating layer to the film. Also, a discharge treatment may be applied on the coating layer after its formation for improving the coating properties and adhesion of the coating layer to the biaxially stretched polyester film of the present invention.

The features of the present invention are displayed to the maximum when coating is conducted in the polyester film producing process and the coated film is then stretched. It is especially preferable to carry out coating before tentering as this makes it possible to minimize or unnecessitate enlargement of the drying oven. In a typical embodiment of the process of the present invention, the said aqueous coating composition is applied on a film which has been stretched in the machine (longitudinal) direction, and this coated film is dried, stretched transversely, heat set and taken up. If necessary, the thus treated film may be re-stretched in the longitudinal direction and relaxed. Drying of the coating layer is preferably conducted during preheating before transverse stretching of the polyester film or in the course of transverse stretching. In other similar modes of practice of the present invention, the non-stretched film is coated and then biaxially stretched simultaneously in a tenter, or the non-stretched film is, after coating, monoaxially stretched in a tenter.

The coating layer in the present invention may be of a single-layer or multi-layer structure, or it may be provided as a single layer or plural layers in a multi-layer structure. A typical film producing process according to the present invention will be described in further detail.

The starting polyester material is supplied to an extruder, melted at a temperature above the melting point of the polyester and extruded as a molten sheet from a slit die. The molten sheet is rapidly cooled to a temperature below the glass transition point and solidified on a rotary cooling drum to obtain a non-stretched sheet of a substantially amorphous state. In this operation, it is preferable to elevate adhesion between the sheet and the rotary cooling drum for improving flatness of the sheet, and for this purpose, an electrostatic pinning method and/or liquid coat adhering method are preferably used in the present invention.

The thus obtained non-stretched coated sheet is first stretched in the machine direction. This stretching is preferably conducted at a temperature in the range of 70 to 150° C. for a stretch ratio of 2.5 to 6 times. Stretching may be conducted in a single step or in two or more steps. In the present invention, the said coating solution is applied on at least one side of the sheet and then dried at an arbitrary stage in the process. Most preferably, this operation is conducted at a stage after longitudinal stretching and before transverse stretching. Then the resulting monoaxially oriented film is once cooled to a temperature below the glass transition point or not cooled but preheated to a temperature range of, for example, 90 to 150° C., and further stretched 2.5 to 5 times, preferably 3.0 to 4.5 times transversely, namely in the direction orthogonal to the direction of longitudinal stretching, to obtain a biaxially oriented film. If necessary, preheating may be reinforced. The thus obtained film is heat treated for a period of one second to 5 minutes with an elongation of not more than 30% or under a limited shrinkage or constant length. In this process, in order to attain an optimal degree of heat shrinkage in the longitudinal direction, it is possible to incorporate an appropriate technique, such as relaxing the film by an amount of not more than 10%, preferably not more than 5%, in the longitudinal direction in the step of heat treatment or after the heat treatment. The heat treatment temperature, though variable depending on the stretching conditions, is preferably in the range of 180 to 250° C., more preferably 200 to 230° C. If the heat treatment temperature exceeds 250° C., the film density may become too high, and also the coat may be partly pyrolyzed. On the other hand, if the heat treatment temperature is below 180° C., the film may have large heat contraction to invite an unfavorable consequence.

In the production of the coated film according to the present invention, non-conforming products are formed in a certain proportion. It is of great significance industrially to recycle such non-conforming products. If the reprocessed material is not mixed in the feedstock polyester, the production cost elevates to invite commercial disadvantages. However, mixing of a too much quantity of the reprocessed material gives rise to the problems such as coloration in the melt extruding step and impaired dynamic properties of the produced polyester film. The actual mixing rate is variable depending on the various factors such as thickness of the polyester film to be produced, thickness of the coat, coating content, production yield, etc., but generally when the coating exceeds 10% by weight, there is a possibility that the product be impaired in optical and dynamic properties such as mentioned above.

The coated film according to the present invention excels in adhesive quality, transparency and anti-block properties, so that it is particularly suited for applications where transparency is required. The coating in the present invention is also valuable in use with translucent or opaque films. It is often considered that transparency of the coat is unnecessary for the translucent or opaque films, but this is not always true. Coat transparency is associated with gloss of the film, that is, a clouded coat reduces film gloss. It is greatly beneficial for all types of polyester films that good adhesive quality can be provided while maintaining gloss of the base film. Generally, a glossy coat is smooth and flat at the surface and therefore has a blocking tendency. The film according to the present invention has eliminated this problem.

The polyester film of the present invention has a novel coat and excels in transparency, gloss, anti-block properties and adhesive quality, and its industrial value is high.

EXAMPLES

The present invention will be described in further details by showing the examples thereof, which examples, however, are merely intended to be illustrative and not to be construed as limiting the scope of the invention in any way. The evaluation methods used in the examples are as described below. In the following Examples and Comparative Examples, all "parts" are by weight unless otherwise noted.
(1) Intrinsic Viscosity [h] (dl/g) of the Polymer 1 g of the polymer was dissolved in 100 ml of a phenol/tetrachloroethane (50/50 by weight) mixed solvent, and the viscosity of the solution was measured at 30° C.
(2) Film Haze Cloudiness of the film was determined according to JIS-K6714 using an Ulbricht sphere hazeometer NDH-20D (mfd. by Nippon Denshoku Kogyo KK). As a measure of transparency, the increment of haze by the coating layer should preferably be not more than 0.3%.
(3) Stickiness (Blocking Tendency)

Films were placed one over another and pressed under the conditions of 40° C., 80% RH, 10 kg/cm$^2$ and 20 hours. Usually pressed films stay sticking to each other. These films were peeled off and peel strength was measured according to ASTM-D-1893. Higher peel strength indicates stronger stickiness (blocking tendency). If the films with such strong stickiness are rolled up, blocking tends to take place, so that such films are unacceptable as an industrial product. Thus, the smaller the numerical value of stickiness, the more preferable. Even in the case of a thick film, if its stickiness is large, the film may break when it is unwound.
(4) Adhesive Quality 1

A ultraviolet curable ink was applied on the film surface, then dried and cured, and the degree of adhesion between the coat and the polyester film was evaluated under the conditions described below.
Ultraviolet Curable Ink:

Offset printing ink "FD Carton P" (indigo, mfd. Toyo Ink Co., Ltd.)
Coating:

The above ink was applied by a offset printing machine RI Tester "RI-2" (mfd. Mei-Seisakusho Co., Ltd.). Coating weight after drying: 5 μm.
Curing:

The coat was cured by a UV irradiation lamp "UVC-402/1HN:302/1MH" (mfd. Ushio Denki Co., Ltd.) under such conditions that the power of metal halide lamp was 120 W/cm, the line speed was 10 m/min and the distance between the lamp and film was 100 mm.

Dried at 120° C. for 3 minutes and then allowed to stand for one day.

Evaluation of Adhesion:

The sample was rubbed by the hands and then subjected to a Scotch tape test, and the degree of peel was rated according to the following criterion.
A: Excellent (The ink did not peel off at all.)
B: Fine (The ink peeled off slightly (in an area ratio of less than 10)).
C: Good (The ink peeled off to some degree (in an area ratio of 10 to 50%).
D: Rather good (The ink peeled off to a considerable degree (in an area ratio of 50 to 100%).
E: Poor (The ink at the area where the tape was attached peeled off entirely).

(5) Adhesive Quality 2

As an example of water-based topcoating, the following coating was applied on a base film and subjected to a peel test as described below.

Coating Composition: Polyvinyl Alcohol (Saponification Degree: 88%)=100 (Parts by Weight)

A polyvinyl alcohol solution of the above composition was prepared and it was applied on the base film surface and dried at 80° C. for 5 minutes to form a 10 μm thick coat.

Solvent: water/ethanol=80/20 wt %. This coated film was subjected to a peel test as follows.

Adhesive quality: An adhesive tape was stuck to the film and then pulled apart, and the degree of peeling of the polyvinyl alcohol (PVA) layer was rated according to the following criterion.
A: Excellent (The PVA layer did not peel off at all.)
B: Fine (The PVA layer peeled off slightly (in an area ratio of less than 10)).
C: Good (The PVA layer peeled off to some degree (in an area ratio of 10 to 50%).
D: Rather good (The PVA layer peeled off to a considerable degree (in an area ratio of 50 to 100%).
E: Poor (The PVA layer at the area where the tape was attached peeled off entirely).

(6) Adhesive Quality 3

As another example of water-based topcoating, the following coating was applied on a base film and subjected to a peel test.

Coating Composition: Gelatin=100 (Parts by Weight)

A hot water solution of gelatin of the above composition was prepared, and it was applied on the base film surface and dried at 80° C. for 5 minutes to form a 10 μm thick coat. This coated film was subjected to a peel test as follows.

Adhesive quality: An adhesive tape was stuck to the film and then pulled apart, and the degree of peeling of the gelatin layer was rated according to the following criterion.
A: Excellent (The gelatin layer did not peel off at all.)
B: Fine (The gelatin layer peeled off slightly (in an area ratio of less than 10)).
C: Good (The gelatin layer peeled off to some degree (in an area ratio of 10 to 50%).
D: Rather good (The gelatin layer peeled off to a considerable degree (in an area ratio of 50 to 100%).
E: Poor (The gelatin layer at the area where the tape was attached peeled off entirely).

Comparative Example 1

Polyethylene terephthalate containing 0.005% by weight of $SiO_2$ having an intrinsic viscosity of 0.65 and a particle size (diameter) of 1.5 μm was dried by a conventional method, supplied to an extruder, melted at 290° C., extruded into the form of a sheet, and rapidly cooled on a cooling roll using an electrostatic pinning method to obtain an amorphous sheet. The thus obtained non-stretched sheet was roll stretched 2.5 times at 85 °C., followed by 1.3 times stretching at 95° C., in the machine direction. The resulting monoaxially stretched film was led to a tenter, whereby the film was stretched 4.0 times in the transverse direction at 120° and heat treated at 235° C. to obtain a biaxially stretched polyester film with the base polyester film thickness of 50 μm. The obtained film was a flat film having high transparency but defective in adhesion. Transparency and adhesion of the obtained film are shown in Table 3.

Comparative Examples 2–3 and Examples 1–9

The monoaxially stretched films were obtained in the same way as in Comparative Example 1. On one side of each of these films was applied a coating prepared by blending the materials shown in Table 1 with a formulation shown in Table 2. Then, like in Comparative Example 1, the film was led into a tenter and thereby dried, stretched transversely and heat treated to obtain a biaxially stretched film corresponding to each example described in Table 3. With the coat being also stretched, the final dry coat thickness was 0.04 μm. Transparency, blocking tendency and adhesive quality of the obtained coated films are shown in Table 3.

Any of the films of Examples 1 to 9 showed excellent adhesive quality, but the films of Comparative Examples 2 and 3, in which a blocked isocyanate or an alkylolmelamine was used as crosslinking agent, were poor in adhesion to the water-based topcoating although they showed good adhesive quality to some topcoatings.

In Examples 1 to 9, all of polyesters, polymers of vinyl monomers and polyurethanes showed good adhesive quality. Especially, polyurethanes were excellent in general.

It can be seen from Examples 3 to 6 that the higher the glass transition temperature of the binder polyurethane, the smaller is the blocking tendency. Example 6 showed particularly high blocking resistance.

In Example 6, butyl cellosolve was additionally used (contained in B6) as an organic solvent in the coating solution. Example 6 had better transparency and adhesive quality than Example 8 in which B8 containing no butyl cellosolve was used instead of B6. Thus, in the coatings according to the present invention, both transparency and adhesive quality are improved by containing a water-soluble organic solvent having a higher boiling point than water in a polymer with a high glass transition temperature.

Examples 4, 5 and 6 were all highly rated in evaluation of adhesive quality. These specimens were subjected to a further test for evaluating their relative difference in polyurethane adhesion. In this test, a gelatin coat was formed on each film by the testing method of adhesive quality 3, and then two specimens were picked up and pasted to each other at their gelatin sides with an epoxy adhesive. After sufficient curing, the two films were forcibly separated from each other with hands. It was judged that the specimen on which the gelatin coat was left had better adhesive quality. As a result of this relative comparison between the above specimens, it was found that Example 5 had better adhesive quality than Example 4, and Example 6 had better adhesive quality than Example 5.

It is thus noted that in the formulations according to the present invention, a polyester polyurethane having the carboxylic acid residues with at least part thereof having been aquated with an amine or ammonia has better adhesive quality.

It is seen from Examples 5, 6 and 7 that even better adhesive quality is provided by the type that satisfies the afore-mentioned conditions (1) and (2).

Referential Example 1

The same procedure as defined in Example 4 was conducted except for the changes of particle size and content of the filler in the base film and the discharge of polyester to obtain a 100 μm thick film roll with Ra=0.02 μm. In this Example, in-line coating was conducted on both sides of the film. The obtained coated film had adhesive quality equal to that of the film of Example 4, and its blocking force was not less than 500 g.

Example 10

A roll of film coated with the coating composition of Example 5 was obtained in the same way as in Referential Example 1. Its blocking force was 250 g and its adhesive quality was equal to that of the film of Example 5.

Example 11

A roll of film coated with the coating composition of Example 6 was obtained in the same way as in Referential Example 1. This film showed a blocking force of 80 g and had adhesive quality equal to that of the film of Example 6.

In the above Referential Example 1 and Examples 10 and 11, there were produced the 1 m wide and 1,000 m long rolls of film. In each of these rolls of film, gage nonuniformity was 3%. These rolls of film were left indoors for one month and then unrolled. In the roll of Referential Example 1, the opposing film surfaces stack fast to each other, and when the film was unrolled, it was ruptured in the course of unrolling. The rolls of Examples 10 and 11 could be unfolded with no problem and could be offered to use as an undercoated film.

TABLE 1

| Symbol | Contents |
|---|---|
| B1 | Polyester-based binder.<br>Monomer composition: (acid moiety) terephthalic acid/5-sodiumsulfoisophthalic acid//(diol moiety) ethylene glycol/diethylene glycol = 92/8//77/23 (mol %)<br>Offered as a water dispersion of the polymer Produced from copolymerization of the above monomer composition. |
| B2 | Polyacrylate-based binder<br>Monomer composition: methyl methacrylate/ethyl acrylate/acrylonitrile/N-methylolacrylamide/methacrylic acid = 41/46/7/51 (mol %)<br>Offered as a water dispersion of the polymer Produced from copolymerization of the above monomer composition. Emulsifier: polyoxyethylene nonylphenyl ether ammonium sulfate (5 wt % of the total amount of monomers) |
| B3 | Polyurethane-based binder (Parmarine UA-200 produced by Sanyo Chemical Industries Co., Ltd.; a water dispersion of non-yellowing polyether polyurethane; Tg < 0° C.) |
| B4 | Polyurethane-based binder (Parmarine UA-310 produced] by Sanyo Chemical Industries Co., Ltd.; a water dispersion of non-yellowing polycarbonate polyurethane; Tg < 0° C.) |
| B5 | Polyurethane-based binder (offered as a water dispersion of a polyurethane produced by reacting 94 parts by weight of a polyester comprising the following monomeric composition, 6 parts by weight of 2,2-dimethylolpropionic acid and 11 parts by weight of isophorone diisocyanate. The reaction product was neutralized with triethylamine and dispersed in water. Tg of the polyurethane proper = 29° C.; tensile force = 220 kg/cm²; elongation = 30%. Monomeric composition of the polyester: (acid moiety) terephthalic acid/isophthalic acid/(diol moiety) ethylene glycol/diethylene glycol = 60/40/61/39 (mol %)) |
| B6 | Polyurethane-based binder (a water dispersion of a polyurethane produced by reacting 94 parts by weight of a polyester comprising the following monomeric composition, 6 parts by weight of 2,2-dimethylolpropionic acid and 10 parts by weight of tolylene diisocyanate. The reaction product was neutralized with diethylethanolamine and dispersed in water by adding butyl cellosolve. Tg of polyurethane proper = 61° C.; tensile force = 360 kg/cm²; elongation = 30%. Monomeric composition of polyester: terephthalic acid/isophthalic acid/ethylene glycol/neopentyl glycol = 60/40/65/35 (mol %)) |
| B7 | Polyurethane-based binder (a water dispersion of polyester polyurethane. 100% modulus = 39 kg/cm²; tensile force = 160 kg/cm²; elongation = 500%; Tg < 0° C.) |
| B8 | Same as B6, but no butyl cellosolve was used for water dispersion. |
| N1 | A self-emulsifiable isocyanate having repeating Units of ethylene oxide and two or more isocyanate groups. Prepared in the following way.<br>Polyethylene glycol monomethyl ether (average number of repeating units of ethylene oxide = 15.2) and sodium dialkylsulfosuccinate were mixed so that their nonvolatile weight ratio would become 2:1, and water and solvent remaining in the material were removed. 1,000 g of HDI buret type polyisocyanate (Gelanate 24A-100 produced by Asahi Chemical Industries Co., Ltd.) and 300 g of the said mixture of polyethylene glycol monomethyl ether and sodium dialkylsulfosuccinate were mixed and an urethanation reaction was carried out at 90° C. for 2 hours. The obtained highly emulsifiable polyisocyanate composition was a light yellowish liquid with nonionic hydrophilic groups = 16.7 wt %; ionic surfactant = 7.7 wt %; isocyanate group content = 16.6 wt %; weight-average molecular weight = 1,100; viscosity = 4,100 mPa · s (25° C.). |
| N2 | A self-emulsifiable isocyanate having repeating units of ethylene oxide and two or more isocyanate groups. Prepared in the following way.<br>Hexamethylene diisocyanate and methoxypolyethylene glycol were subjected to an urethanation reaction with stirring at 90° C. for 2 hours, and then tetramethylammonium caprate was added as an isocyanating catalyst at 90° C. 4 hours later, at the point when the conversion to polyisocyanate became 30%, phosphoric acid was added to stop the reaction. The unreacted portion of hexamethylene diisocyanate was removed to give an isocyanate prepolymer as a light yellowish transparent liquid with a viscosity of 800 mPa · s and an isocyanate group content of 20.2% by weight. Then methoxypolyethylene glycol and sodium dioctylsulfosuccinate were mixed so that their nonvolatile weight ratio would become 3:1, and water and solvent were removed by vacuum distillation. 100 g of the said isocyanate prepolymer and 10 g of the said mixture of methoxyethylene glycol and sodium dialkylsulfosuccinate were mixed to carry out an urethanation reaction at 90° C. for 8 hours. The produced polyisocyanate composition was a light yellowish liquid and had an isocyanate group content of 16.4%, a weight-average molecular weight of 900 and a viscosity of 1,300 mPa · s. |
| N3 | A water dispersion of a block isocyanate (Takerak W-710 produced by Takeda Chemical Industries Ltd.; average particle size of the dispersion = 0.12 μm) |
| C1 | Hexamethoxymethylmelamine |
| S1 | Silicon oxide, offered as a water dispersion (colloidal silica) with a particle size of 0.07 μm. |

TABLE 2

| No. | Coating formulations (solids) |
|---|---|
| S1 | B1/N1/S1 = 75/20/5 |
| S2 | B2/N1/S1 = 75/20/5 |
| S3 | B3/N1/S1 = 75/20/5 |
| S4 | B4/N1/S1 = 75/20/5 |
| S5 | B5/N1/S1 = 75/20/5 |
| S6 | B6/N1/S1 = 75/20/5 |
| S7 | B7/N1/S1 = 75/20/5 |
| S8 | B8/N1/S1 = 75/20/5 |
| S9 | B6/N2/S1 = 75/20/5 |
| S10 | B6/N3/S1 = 75/20/5 |
| S11 | B6/C1/S1 = 75/20/5 |

TABLE 3

| | Coat | | | Film properties[1] | | | |
|---|---|---|---|---|---|---|---|
| | | Thickness | Haze | Stickiness | Adhesive qualities | | |
| | Composition | ($\mu$m) | (%) | g | 1 | 2 | 3 |
| Ex. 1 | S1 | 0.04 | 0.8 | 30 | A | C | C |
| Ex. 2 | S2 | 0.04 | 0.9 | 20 | A | C | C |
| Ex. 3 | S3 | 0.04 | 0.7 | >500 | A | B | C |
| Ex. 4 | S4 | 0.04 | 0.7 | >500 | A | A | A |
| Ex. 5 | S5 | 0.04 | 0.8 | 150 | A | A | A |
| Ex. 6 | S6 | 0.04 | 0.7 | 45 | A | A | A |
| Ex. 7 | S7 | 0.04 | 0.8 | 400 | A | B | B |
| Ex. 8 | S8 | 0.04 | 1.4 | 30 | A | A | A |
| Ex. 9 | S9 | 0.04 | 0.7 | 50 | A | A | A |
| Comp. Ex. 1 | No | No | 0.7 | 0 | E | E | E |
| Comp. Ex. 2 | S10 | 0.04 | 4.5 | 10 | C | C | D |
| Comp. Ex. 3 | S11 | 0.04 | 0.9 | 50 | D | D | D |

[1]In all Examples, surface roughness was 0.01 $\mu$m.

What is claimed is:

1. A coated film comprising a polyester film having a coat on at least one side thereof, obtained by applying on at least one side of a polyester film a coating solution containing (1) a self-emulsifiable isocyanate having repeating units of ethylene oxide and two or more isocyanate groups, (2) at least one polymer selected from the group consisting of polyesters, polymers of vinyl monomers and polyurethanes, and (3) a polymer having a glass transition temperature of not lower than 0° C., then drying and stretching the coated film.

2. The coated film according to claim 1, wherein the coating solution contains an ionic surfactant.

3. The coated film according to claim 1, wherein the coating solution contains a polymer having a glass transition temperature of not lower than 40° C.

4. The coated film according to claim 1, wherein the coating solution contains a polyester polyurethane having carboxylic acid residues, with at least part thereof having been aquated with an amine or ammonia.

5. The coated film according to claim 4 wherein the polyester polyurethane satisfies the following conditions (1) and (2) at the same time:

$$\text{Tensile force} \geq 200 \text{ kg/cm}^2 \quad (1)$$

$$\text{Elongation} \leq 250\% \quad (2).$$

6. The coated film according to claim 1, wherein the coating solution contains a water-soluble organic solvent having a higher boiling point than water.

7. The coated film according to claim 1, wherein the coating solution contains fine particles which satisfy the following conditions (3) and (4) at the same time:

$$0.5 \, h < d < 2 \, h \quad (3)$$

$$d < 0.2 \, \mu m \quad (4)$$

wherein d ($\mu$m) is the particle size and h ($\mu$m) is the coating thickness.

8. The coated film according to claim 1, wherein the film has a surface roughness (Ra) of not more than 0.10 $\mu$m.

9. The coated film according to claim 1, wherein the film has a blocking force (F) of not more than 300 g.

10. A film roll comprising a coated film as defined in claim 1, wherein gage nonuniformity in the width direction of the film is not more than 5%.

11. A coated film comprising a polyester film having a coat on at least one side thereof, obtained by applying on at least one side of a polyester film a coating solution containing (1) a self-emulsifiable isocyanate having repeating units of ethylene oxide and two or more isocyanate groups, (2) at least one polymer selected from the group consisting of polyesters, polymers of vinyl monomers and polyurethanes, and (3) a polyester polyurethane having carboxylic acid residues, with at least part thereof having been aquated with an amine or ammonia and then drying and stretching the coated film, said polyester polyurethane satisfying the following conditions (1) and (2) at the same time:

$$\text{Tensile force} \geq 200 \text{ kg/cm}^2 \quad (1)$$

$$\text{Elongation} \leq 250\% \quad (2).$$

12. The coated film according to claim 11, wherein the coating solution contains an ionic surfactant.

13. The coated film according to claim 11, wherein the coating solution contains a polymer having a glass transition temperature of not lower than 40° C.

14. The coated film according to claim 11, wherein the coating solution contains a water-soluble organic solvent having a higher boiling point than water.

15. The coated film according to claim 11, wherein the coating solution contains fine particles which satisfy the following conditions (3) and (4) at the same time:

$$0.5 \, h < d < 2 \, h \quad (3)$$

$$d < 0.2 \, \mu m \quad (4)$$

wherein d ($\mu$m) is the particle size and h ($\mu$m) is the coating thickness.

16. The coated film according to claim 11, wherein the film has a surface roughness (Ra) of not more than 0.10 $\mu$m.

17. The coated film according to claim 11, wherein the film has a blocking force (F) of not more than 300 g.

18. A film roll comprising a coated film as defined in claim 11, wherein gage nonuniformity in the width direction of the film is not more than 5%.

19. A coated film comprising a polyester film having a coat on at least one side thereof, obtained by applying on at least one side of a polyester film a coating solution containing (1) a self-emulsifiable isocyanate having repeating units of ethylene oxide and two or more isocyanate groups, and (2) at least one polymer selected from the group consisting of polyesters, polymers of vinyl monomers and polyurethanes, then drying and stretching the coated film, wherein the film has a blocking force (F) of not more than 300 g.

20. The coated film according to claim 19, wherein the coating solution contains an ionic surfactant.

21. The coated film according to claim 19, wherein the coating solution contains a polymer having a glass transition temperature of not lower than 40° C.

22. The coated film according to claim 19, wherein the coating solution contains a water-soluble organic solvent having a higher boiling point than water.

23. The coated film according to claim 19, wherein the coating solution contains fine particles which satisfy the following conditions (3) and (4) at the same time:

$$0.5\,h < d < 2\,h \quad (3)$$

$$d < 0.2\,\mu m \quad (4)$$

wherein d ($\mu$m) is the particle size and h ($\mu$m) is the coating thickness.

24. The coated film according to claim 19, wherein the film has a surface roughness (Ra) of not more than 0.10 $\mu$m.

25. A film roll comprising a coated film as defined in claim 19, wherein gage nonuniformity in the width direction of the film is not more than 5%.

* * * * *